(12) United States Patent
Lowder et al.

(10) Patent No.: US 7,792,330 B1
(45) Date of Patent: Sep. 7, 2010

(54) SYSTEM AND METHOD FOR DETERMINING RANGE IN RESPONSE TO IMAGE DATA

(75) Inventors: Richard Lowder, Sherman, TX (US);
Robert Bless, Jr., Allen, TX (US);
Rustin Allred, Plano, TX (US)

(73) Assignee: Mustang Technology Group, L.P., Allen, TX (US)

( * ) Notice: Subject to any disclaimer, the term of this patent is extended or adjusted under 35 U.S.C. 154(b) by 981 days.

(21) Appl. No.: 11/540,263

(22) Filed: Sep. 29, 2006

Related U.S. Application Data

(60) Provisional application No. 60/722,500, filed on Sep. 30, 2005.

(51) Int. Cl.
*G06K 9/00* (2006.01)

(52) U.S. Cl. ..................................... 382/106

(58) Field of Classification Search ............... None
See application file for complete search history.

(56) References Cited

U.S. PATENT DOCUMENTS

| 3,982,246 A | * | 9/1976 | Lubar ................. 342/451 |
| 6,222,479 B1 | * | 4/2001 | Honigsbaum ............ 342/13 |
| 2003/0146869 A1 | * | 8/2003 | Lin et al. ............ 342/357.14 |

* cited by examiner

*Primary Examiner*—Charles Kim
(74) *Attorney, Agent, or Firm*—Anderson & Levine, L.L.P.

(57) ABSTRACT

A distance determining system for use in a movable device. The system comprises circuitry for capturing an image of an object external from the movable device. The system also comprises circuitry, responsive to the image, for determining an angle between a direction of movement of the movable device and the object. Lastly, the system also comprises circuitry for determining a distance to the object in response to at least the angle.

26 Claims, 4 Drawing Sheets

SYSTEM AND METHOD FOR DETERMINING RANGE IN RESPONSE TO IMAGE DATA

CROSS-REFERENCES TO RELATED APPLICATIONS

This application claims priority under 35 U.S.C. §119 of U.S. Provisional Application No. 60/722,500, filed Sep. 30, 2005.

STATEMENT REGARDING FEDERALLY SPONSORED RESEARCH OR DEVELOPMENT

Not Applicable.

BACKGROUND OF THE INVENTION

The present embodiments relate to determining a range between a system and an object or point away from the system and are more particularly directed to determining such a range in response to image data that depicts the object.

The prior art often determines a distance or range from a system to an object away from the system through the use of active sensors. Typically an active sensor, by definition, transmits or emits its own signal and detects a response of that signal such as by receiving a reflected version of the transmitted signal. However, such an approach, while effective, typically has one or more undesirable attributes. These attributes include cost, size, weight and complexity, all of which may negatively impact on the system.

In view of the above, the prior art provides drawbacks and the preferred embodiments improve upon these drawbacks as demonstrated below.

BRIEF SUMMARY OF THE INVENTION

In the preferred embodiment, there is a distance determining system for use in a movable device. The system comprises circuitry for capturing an image of an object external from the movable device. The system also comprises circuitry, responsive to the image, for determining an angle between a direction of movement of the movable device and the object. Lastly, the system also comprises circuitry for determining a distance to the object in response to at least the angle.

Other aspects are also disclosed and claimed.

DETAILED DESCRIPTION OF THE INVENTION

The preferred embodiments are described below in connection with an example as implemented into an air flight vehicle such as an airplane, as the present inventors believe that this invention is well understood in such applications. However, the invention also may be implemented in, and provide significant benefit to, other systems that benefit by determining a range or distance from the system to an object or objects away from the system. Accordingly, it is to be understood that the following description is provided by way of example only and is not intended to limit the inventive scope.

Figure 1:
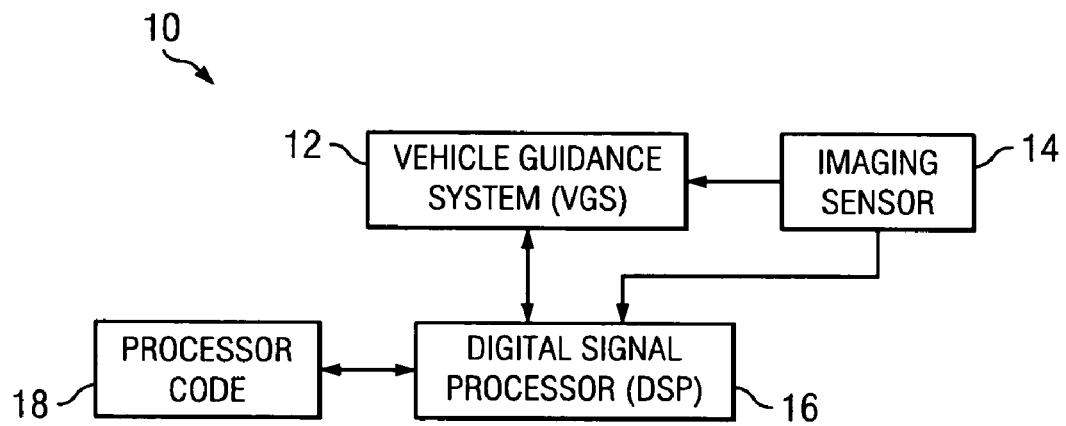
FIG. 1 illustrates a functional block diagram of a system 10 for determining range to an object according to a preferred embodiment.

FIG. 1 illustrates a functional block diagram of a system 10 for determining range to an object according to a preferred embodiment. The general nature of each individual block of system 10 may be known to one skilled in the art, but novel aspects are added thereto in the collection, communication, and processing of certain data as well as the ranging information that is thereby determined as a result and the steps that may be taken in response thereto. Further, system 10 may be coupled to numerous other devices and, as mentioned above, used in connection with a vehicle or other item from which it is desired to determine distance to an object, where such other devices and the vehicle are not shown in FIG. 1 so as to simplify the present discussion. Moreover, therefore, the following description is by way of example where one skilled in the art may ascertain additional information with respect to such devices or vehicles.

System 10 includes four block functions, namely, a vehicle guidance system ("VGS") 12, an imaging sensor 14, a digital signal processor ("DSP") 16, and processor code 18. Each of these items is now introduced here, with various additional aspects detailed throughout the remainder of this document.

VGS 12 includes apparatus for determining attributes such as positioning, heading, orientation, speed, and acceleration of system 10, such as relative to the Earth and based on one or more measures. For example, VGS 12 may include sufficient apparatus for determining position in response to the Global Positioning System ("GPS"), and it also may include an Inertial Navigation System ("INS"). As is known in the art, GPS refers to a satellite-based radio positioning system that provides full-time three-dimensional position, velocity, and time information that may be received by a GPS receiver that is in a location that receives the GPS signal, such as included in VGS 12 in this case. In response to this information, the GPS receiver equipped device may determine its position, with some level of error, relative to the Earth. INS, also sometimes referred to as Inertial Reference System, typically includes gyroscopes and other electronic tracking systems that detect acceleration and deceleration to thereby compute a system (e.g., aircraft) position in latitude and longitude. VGS 12 also may include hardware and software for performing various computations to determine the attributes discussed above as well as to take further action in response to those attributes, including, as its name suggest, the guidance of the vehicle that includes system 10. Moreover, as further appreciated with the knowledge provided from the remainder of this document, VGS 12, as enhanced with the range information ascertained by system 10, may exploit that range information for use in various applications, including but not limited to altimetry, collision avoidance, navigation, automatic landing, three-dimensional (3-D) imaging, targeting, and similar applications.

Lastly, VGS 12 is bi-directionally coupled to DSP 16 and it is also coupled to receive information from imaging sensor 14.

Imaging sensor 14 may be one (or more) of known or ascertainable sensors for capturing data representative of images of objects external from system 10. For example, imaging sensor 14 may be implemented as an infrared camera or sensor, a passive infrared sensor ("PIR"), a forward looking infrared ("FLIR") sensor, a visible spectrum camera, or various other imagery sensors. Typically the image data is in the form of picture element, or pixel, data, where as known in the art each pixel represents data at a point perceived by the sensor and the combination of the pixels combine to form an image that is perceived by sensor 14 and for which each pixel may have a defined coordinate in an image plane. Also in this regard, sensor 14 may be constructed in various manners and may include numerous individual sensing elements. In any event, sensor 14 provides its image data to VGS 12 and also to DSP 16. Note that in the preferred embodiment the connection of image data to VGS 12 is optional and is known in the art, where VGS 12 may use that data for various purposes such as target location and tracking. The connection of image data to DSP 16 permits DSP 16 to perform an inventive methodology for determining distance between sensor 14 and items depicted by the data captured by sensor 14 as detailed below. Lastly, gimbal angles of imaging sensor 14 are also reported to VGS 12 and/or DSP 16 and may be used for reasons detailed below.

DSP 16 and processor code 18 are illustrated to represent the common combination of a processor and its related devices and input/output as well as the programming code for providing instructions to, and receiving processing results from, such a processor. DSP 16 may therefore be any one (or more) of many different commercial computational processors, and often such processors that are more task specific are referred to as DSPs and, hence, that term is used herein. Further, DSP 16, or some other computational processor used as processor 16, may include internal memory as well as an interface(s) to external memory and other peripherals, which are not shown to simplify the Figure but are well known in the computing art. Processor code 18 may include code to cause DSP 16 to perform numerous known operations in system 10 that are not detailed herein, but in addition and per the preferred embodiments as detailed below, processor code 18 directs DSP 16 to process image data provided to it from imaging sensor 14 so as to determine the range (i.e., distance) between sensor 14 and a point or object away from the system, where that point or object is identified in the image data provided by sensor 14 to DSP 16. As an example that is detailed later, therefore, imaging sensor 14 may capture image data of a building at the Earth's surface and with that data and the inventive methodology detailed below, processor code 18 causes DSP 16 to determine the distance from imaging sensor 14 to that building (or a point thereon). Lastly, note that processor code 18 may be written or created by one skilled in the art in numerous forms given the particular device and instruction set architecture of DSP 16 and the methodology detailed below.

Figure 2:
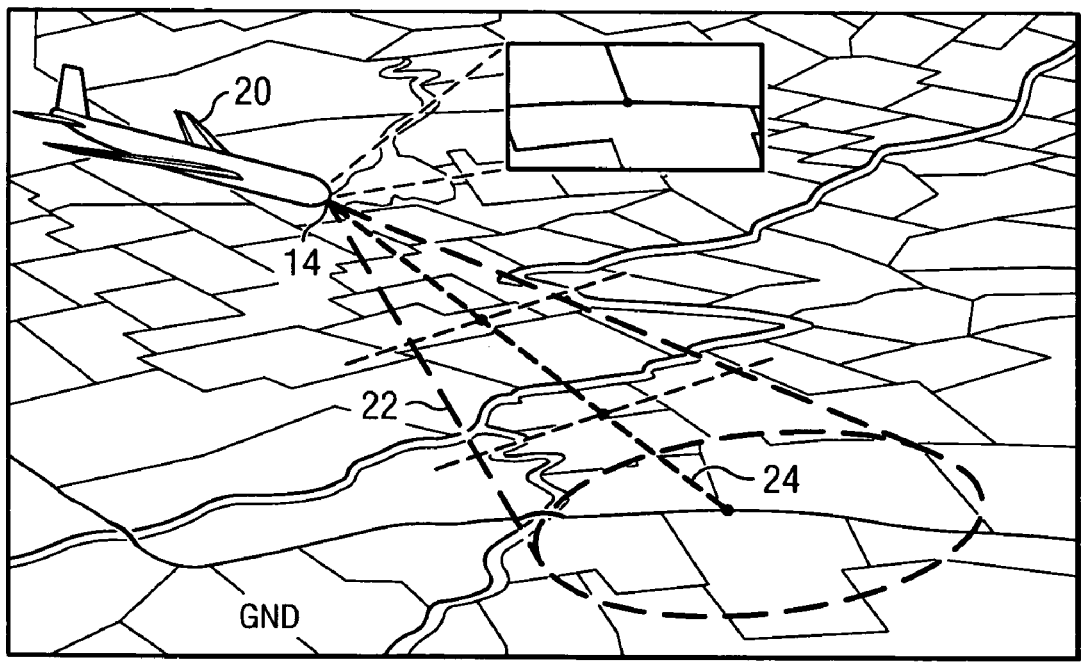
FIG. 2 illustrates an airplane 20 that includes system 10 of FIG. 1.

FIG. 2 illustrates an airplane 20 that includes system 10 described above in connection with FIG. 1. This figure provides a context and illustration of certain terms and aspects described later. In the example of FIG. 2, imaging sensor 14 is presumed to be at or near the front tip or lower portion of airplane 20 and has a field of view ("FOV") 22 extending in the direction of the ground GND. A bore site 24 extends through the center line of FOV 22, where FOV 22 therefore represents in general a cone about bore site 24. Thus, within that cone and likely at or near where that contacts ground GND, various features exist and are captured in the form of data by imaging sensor 14, and that data is provided to DSP 16 (and VGS 12). Note that in the preferred embodiments data is repeatedly captured in this manner, at a frequency that may be selected by one skilled in the art. In any event, however, from data collected at different times, system 10 in the preferred embodiments may determine a distance between sensor 14 and any point within FOV 22. Indeed and by way of introduction to the preferred embodiments, using the available INS/GPS information and the preferably passively-obtained imagery, system 10 determines a respective position vector (range and direction) from system 10 to numerous items external from system 10, referred to herein as features, where the features are within FOV 22. For simplicity, this document assumes that the methodology is used to derive an accurate range estimate by an air vehicle in level flight and equipped with an infrared imaging sensor. However, the methodology may be generalized and thereby also used in numerous other circumstances.

Figure 3:
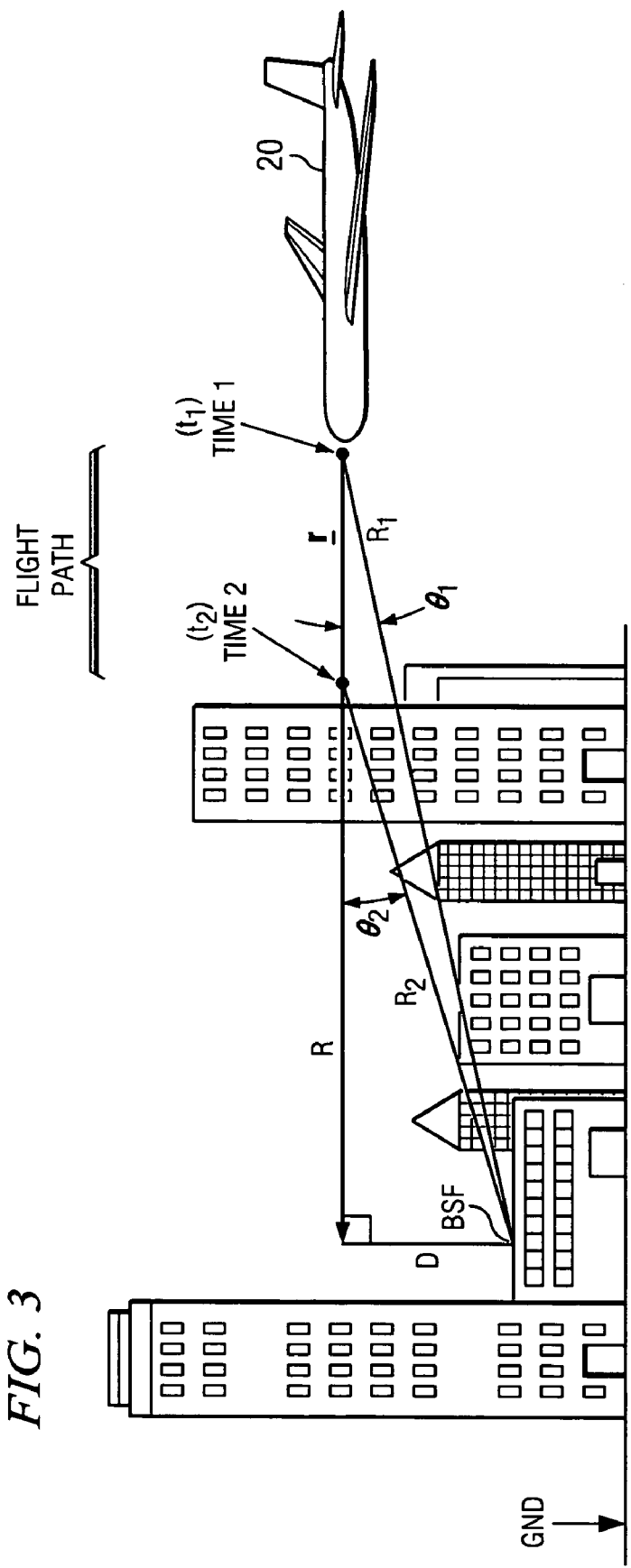
FIG. 3 illustrates airplane 20 of FIG. 2 as it flies along a flight path vector r over ground GND and for sake of examples FIG. 3 also illustrates various ground features.

FIG. 3 illustrates airplane 20 of FIG. 2 as it flies over ground GND, and for sake of examples FIG. 3 also illustrates various ground features. By way of one example, a building structure feature BSF is identified. Also shown in FIG. 3 is a range $R_1$ from sensor 14 aboard airplane 20 to building structure feature BSF, where as detailed below system 10 is able to determine this range $R_1$ based in part on imagery (e.g., PIR imagery) obtained by imaging sensor 14. Particularly, between any two (not necessarily consecutive) measurement times, airplane 20, along with system 10, will move (and possibly rotate) along a certain path. With the aid of VGS 12, the position vector and orientation changes between those two times will be known with a certain precision, and in FIG. 3 this position vector between two measurement times $t_1$ and $t_2$ is denoted with r. At both of times $t_1$ and $t_2$, imaging sensor 14 is able to gather image data of a variety of features, including those on or near ground GND and within the FOV; when sensor 14 is a FIR sensor, then objects on ground GND that register as hot or cold in the PIR image relative to their immediate surroundings are detected in the sensor image data, and this image data is provided by sensor 14 to VGS 12 and DSP 16. In the preferred embodiments, VGS 12 of system 10 also is operable to provide or obtain the body orientation relative to an appropriate inertial frame, such as North-East-Down (NED), and this information also may be provided by VGS 12 to DSP 16. Recall also that the gimbal angles of imaging sensor 14 are provided to DSP 16, where such reporting may be sampled therefore at measurement times $t_1$ and $t_2$. Further, since VGS 12 receives image data from the FOV of imaging sensor 14, then known pixel location of FIR features may be extracted from that data using image processing. With these and possibly other attributes, at times $t_1$ and $t_2$ system 10 determines the respective angle between the flight path vector, r, and the line-of-sight vector to several features. These angles measured for a given feature at the two times $t_1$ and $t_2$ of interest are denoted as $\theta_1$ and $\theta_2$, respectively, and are further used to determine range as discussed below.

Given the preceding determinations, it is observed in connection with the preferred embodiments that geometry may be used in part to determine a range Rx to a feature within the FOV of sensor 14 based on the preceding as well as a few additional observations. Particularly, in FIG. 3, the two points that denote the position of airplane 20 at respective measurement times, $t_1$ and $t_2$, along with a fixed feature in the scene (e.g., building structure feature BSF), provide three points that form the vertices of a triangle. In connection with this triangle, the preferred embodiments use the vector r, and the two above-introduced angles $\theta_1$ and $\theta_2$ to determine the range and position vector to the fixed feature location as follows. In the preferred embodiment, and recalling system 10 of FIG. 1, processor code 18 instructs DSP 16 to perform an inventive methodology that defines two right triangles between sensor 14 and the desired ground feature (e.g., building structure feature BSF) and related to the above-introduced triangle. Particularly, the preferred methodology defines a first right triangle with a vertex at the position of system 10 at time $t_1$ by adding a co-linear extension R of an initially-unknown length to the position vector r so as to define a first side of the triangle and by defining a second side of the triangle of an initially unknown length D and perpendicular to R and extending to the desired ground feature, as shown in FIG. 3. Further, the preferred methodology defines a second right triangle with a vertex as the position of system 10 at time $t_2$ and with the unknown-length R as a first side and the unknown-length and perpendicular D as a second side. Thus, the first right triangle has a hypotenuse of length $R_1$ and the second right triangle has a hypotenuse of length $R_2$, and these hypotenuses $R_1$ and $R_2$ represent the respective ranges to building structure feature BSF at the two measurement times $t_1$ and $t_2$. Given these right triangles, the following relationships of Equations 1 and 2 are true with respect thereto:

$$\frac{D}{R} = \tan\theta_2 \qquad \text{Equation 1}$$

$$\frac{D}{R+r} = \tan\theta_1 \qquad \text{Equation 2}$$

where, in Equation 2, r denotes the length of the vector r.

Looking further to Equations 1 and 2, since angles $\theta_1$ and $\theta_2$ and the vector r are known, having been measured or determined by some or all of the various attributes and methodology of system 10 discussed above, the values of D and R can be computed from these two equations. Combining Equations 1 and 2 and solving for R and D yields the following Equations 3 and 4:

$$R = \frac{r \tan\theta_1}{\tan\theta_2 - \tan\theta_1} \qquad \text{Equation 3}$$

$$D = R \tan\theta_2 \qquad \text{Equation 4}$$

From Equation 3, therefore, by time $t_2$ whereupon airplane 20 has traveled the distance r (i.e., the length of the vector r), then R, the unknown co-linear extension of the position vector r and that forms along with r one side of the first right triangle, or that forms one side of the second right triangle, is determined by the preferred embodiment methodology based on the known values of r, $\theta_1$ and $\theta_2$. Further, with the value of R now determined, then from Equation 4 the other initially-unknown length of both right triangles, that is, the length of D perpendicular to R and extending to the desired ground feature, may be determined. Accordingly, at this point the preferred embodiment has determined the length of the triangle sides both opposite and adjacent the known angles $\theta_1$ and $\theta_2$.

Next in the preferred embodiment methodology, and consistent with the goal of determining ranges, then the ranges $R_1$ and $R_2$ to feature BSF at the two measurement times $t_1$ and $t_2$ are determined, each as the hypotenuse of the right triangles defined above and in view of their sides D and R+r (for $R_1$) or D and R (for $R_2$), as shown in the following Equations 5 and 6:

$$R_1 = \sqrt{D^2 + (R+r)^2} \qquad \text{Equation 5}$$

$$R_2 = \sqrt{D^2 + R^2} \qquad \text{Equation 6}$$

The above described methodology in combination with Equation 5 demonstrates that a range $R_1$ is therefore established in response to three determined measures, namely, angle $\theta_1$ measured at a first time, angle $\theta_2$ measured at a second time, and the linear distance r traveled by system 10 between those two times. In other words, if Equations 3 and 4 were substituted into Equation 5, then it is seen that range $R_1$ may be determined in terms of and, therefore, in response to, r, $\theta_1$, and $\theta_2$. Similarly, if Equations 3 and 4 were substituted into Equation 6, then it is seen that range $R_2$ also may be determined in terms of and, therefore, in response to r, $\theta_1$, and $\theta_2$. Given the preceding, therefore, both ranges $R_1$ and $R_2$ may be computed near instantaneously at time $t_2$ (with sufficient computing power of DSP 16). Moreover, by repeating these steps for multiple significant PIR features as they come and go out of the FOV of imaging sensor 14, the preferred embodiments may determine the range Rx from airplane 20 to numerous points in a scene.

Once a range to a feature is determined as described above, the preferred embodiments may be expanded further to include use of that determination in various manners. As one example, the determined range may be displayed, either in the vehicle carrying system 10 or communicated elsewhere for display. As another example, one preferred use is for altimetry, that is, the range to ground objects can be estimated to derive the altitude of the vehicle that is carrying system 10. To use this technique for altimetry, features on the ground are sought, and then using multiple images containing some common ground features, the vector from the vehicle to the ground is estimated, whereupon the down element of this vector is an estimate of the vehicle's altitude. As another example, range estimates to other objects can be derived for use in collision avoidance. In this case, system 10 of the preferred embodiments can be used to estimate ranges to external objects that the vehicle containing system 10 must avoid. An object in the field of view is not a threat if it is distant; but immediate evasive actions might be necessary if it is very close. Thus, the preferred embodiment may establish a threshold distance whereupon a determined distance to an object that is less than the threshold gives rise to an evasive action that changes the path of movement of airplane 20. As still another example, the positioning of airplane 20 may be estimated based on the determined range. Specifically, with the line-of-sight unit vector along $R_2$ from airplane 20 and toward the PIR feature at issue, also determinable in that instance is any frame of reference (NED, body, or gimbal) by using the orientation angles (typically Euler angles or quaternions from the INS), the gimbal angles (azimuth and elevation or roll and nod), and the pixel location of the PIR source in the focal plane. Accordingly, the preferred embodiments also may multiply this line-of-sight unit vector, at measurement time $t_2$, by the computed range $R_2$, thereby providing a position vector of the PIR feature relative to airplane 20 at measurement time $t_2$. The preferred embodiments also may assist in navigation by helping an unmanned vehicle establish its position relative to known GPS waypoints. In cases where waypoints are unknown, the preferred embodiments can be used to help the vehicle keep track of its location if GPS is lost. This can be accomplished by constantly establishing relationships between the vehicle and points in the scene during times when GPS information is available. Then, for those times when GPS is lost, the position of the vehicle relative to those same points can be used to establish the absolute position of the vehicle relative to the last good GPS information. For automatic landing, the preferred embodiments may assist both with collision avoidance and with altimetry so that a vehicle can avoid obstructions and land safely on the ground. Lastly, in the case of three-dimensional imaging, the preferred embodiment may be used to derive and display ranges to various features in the scene.

Figure 4:
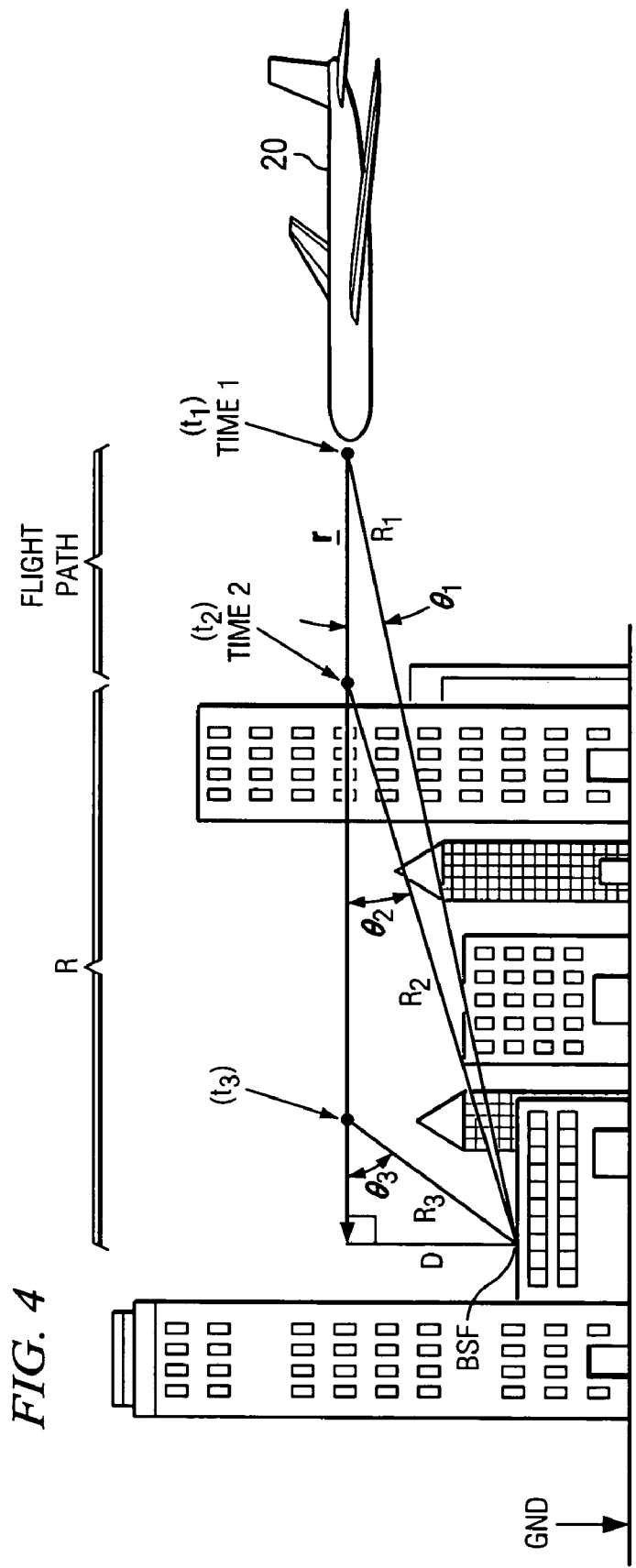
FIG. 4 illustrates the same scene and items as FIG. 3, above, but adds an angle $\theta_3$ that exists between the flight path vector r and the then line-of-sight vector to feature BSF.

FIG. 4 illustrates the same scene and items as FIG. 3, but FIG. 4 adds a point at a third time, $t_3$, representing that when reached by airplane 20, an angle $\theta_3$ exists between the flight path vector r and the then line-of-sight vector to building structure feature BSF. This illustration facilitates a discussion and demonstration of an additional aspect of the preferred embodiments, namely, that provided system 10 already has applied the preferred methodology described above to a previous pair of angles $\theta_1$ and $\theta_2$ to determine respective ranges $R_1$ and $R_2$ to a feature, and assuming also that airplane 20 has not deviated from the direction along the flight vector r as used for the previous determinations, then a subsequent range to the same feature may be determined from a previous determination with respect to the vector r and the new angle, $\theta_3$.

The earlier equations demonstrate that D can be ascertained once system 10 has applied a geometric-recognized methodology to a previous pair of angles $\theta_1$ and $\theta_2$. Accordingly, when airplane 20 continues along the direction of the vector r as used for the previous determinations, then D remains the same. Thus, at a time $t_3$, when $\theta_3$ exists and is measurable between the flight path vector r and the line-of-sight vector, then the following Equation 7 is geometrically accurate:

$$\sin \theta_3 = \frac{D}{R_3} \quad \text{Equation 7}$$

And, Equation 7 may be re-written in terms of $R_3$ as in the following Equation 8:

$$R_3 = \frac{D}{\sin\theta_3} \quad \text{Equation 8}$$

Accordingly, per the preferred embodiment, system 10 stores the value of D once the inventive methodology is applied to a previous pair of angles that were defined relative to the vector r, and so long as airplane 20 continues along that vector, additional ranges may be determined in response to the stored value of D and the sine of a new angle (e.g., $\theta_3$) between that vector r and the feature as measured at a later time as airplane 20 remains on vector r. Here again, however, note that D, as established from Equations 3 and 4, is responsive to r, $\theta_1$ and $\theta_2$, but that re-calculations using those previously-determined values are unnecessary if D is stored. Nonetheless, in lieu of storing D, system 10 may store the previous angles measured and range estimates determined, as airplane 20 traverses along the vector r, and in this case a new range, $R_3$, can be determined according to the following Equation 9:

$$R_3 = \frac{R_2 \sin(\theta_2)}{\sin(\theta_3)} \quad \text{Equation 9}$$

where, Equation 9 is the equivalent of Equation 8, but with its numerator written in terms of $R_2$ and $\theta_2$. Generally speaking the vector r will be known by system 10 so the original methodology through Equation 6 can be used by system 10 in response to two successive angles, but this alternate formulation above can be useful in certain instances such as, for example, where GPS is disrupted at times.

Figure 5:
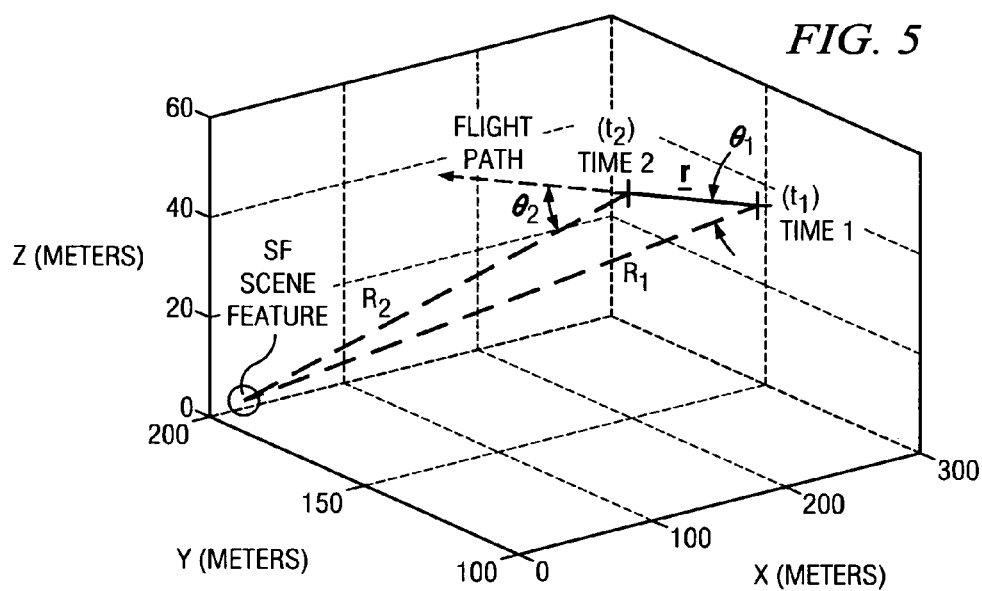
FIG. 5 illustrates a three-dimensional coordinate system defining a space and origin so as to illustrate an example of system 10 implementing the preferred embodiment methodology.

FIG. 5 illustrates a three-dimensional coordinate system defining a space and origin so as to illustrate an example of system 10 implementing the preferred embodiment methodology described above. In FIG. 5, a flight vector r is shown to represent that airplane 20 (not shown) is presumed to travel in a heading along that vector and to traverse the two illustrated points linearly at times $t_1$ and $t_2$. Given that the illustration is an example, the coordinates at times $t_1$ and $t_2$ may be stated with certainty, while in reality VGS 12 of system 10 may estimate those coordinates during flight using known techniques and those estimates also may be compared to, or revised based on, range measurements $R_1$ and $R_2$ that are determined by DSP 16 per the preferred embodiments. These various aspects are explored below.

Figure 6:
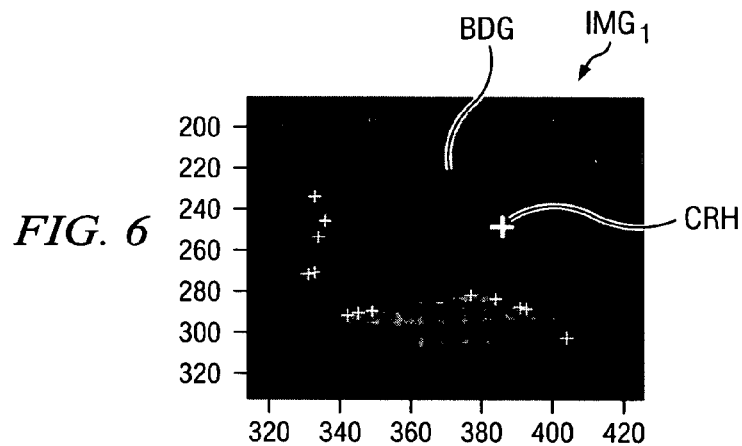
FIG. 6 illustrates a simulated image, $IMG_1$ of data that may be captured by imaging sensor 14 at the measurement time $t_1$.
Figure 7:
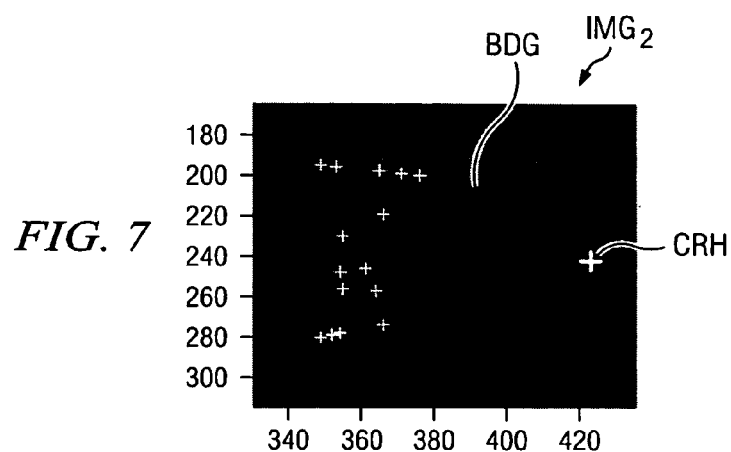
FIG. 7 illustrates a simulated image, $IMG_2$ of data that may be captured by imaging sensor 14 at the measurement time $t_2$.

Before proceeding with FIG. 5 and to better comprehend its example as well as various aspects detailed earlier, FIGS. 6 and 7 each illustrate a respective simulated image, $IMG_1$ and $IMG_2$, of data that may be captured by imaging sensor 14 at the measurement times $t_1$ and $t_2$ discussed above as per the preferred embodiments. In each of images $IMG_1$ and $IMG_2$, a building BDG is shown, as would be captured in the form of the data provided by sensor 14. Moreover, using techniques known in the art, DSP 16, under control of processor code 18, identifies various data patterns in the data, thereby recognizing elements such as boundaries between items, edges, data patterns, and the like. Where identifiable elements are found in the images, they are indicated by respective crosshairs, where one such crosshair CRH is enlarged and labeled in both figures to thereby indicate that it pertains to an element found by DSP 16 to represent a same feature in both images. Thus, in the particular example, it may be seen that crosshair CRH represents a right edge a of perimeter wall of building BDG, and with appropriate hardware and/or software, DSP 16 identifies the location of crosshair CRH as a common feature in both of images $IMG_1$ and $IMG_2$. Thus, per the preferred embodiments detailed above, at time $t_1$, the angle $\theta_1$ between the flight vector r and crosshair CRH of image $IMG_1$ is determined, and at time $t_2$, the angle $\theta_2$ between the flight vector r and crosshair CRH of image $IMG_2$ is determined. With those angles and the magnitude, r, of the flight vector r as between those times $t_1$ and $t_2$, the preferred embodiment may determine a respective estimated range $R_1$ or $R_2$ as between the system and crosshair CRH as the range existed at times $t_1$ and $t_2$.

Returning then to FIG. 5, assume that airplane 20 at time $t_1$ is at an (x, y, z) coordinate position of (250.38 meters, 130.50 meters, 45.04 meters) and that airplane 20 continues in linear fashion to a position of (200.38 meters, 150.50 meters, 45.04 meters) at time $t_2$. Further, VGS 12 is operable to provide estimates of these positions with corresponding coordinates using known technology. Next, and per the preferred embodiments, the vector r is defined between those two positions. In addition, imagery is captured by imaging sensor 14 and to include a same scene feature SF (shown as crosshair CRH in FIGS. 6 and 7) at times $t_1$ and $t_2$ thereby permitting the defining of respective line of sight vectors $R_1$ and $R_2$ to scene feature SF. Given the estimated positions of airplane 20 at times $t_1$ and $t_2$ and the imagery captured at those times to include scene feature SF, the preferred embodiments determine the length of those vectors $R_1$ and $R_2$ (i.e., the distance between system 10 aboard airplane 20 and that feature) as described above. In this regard, DSP 16 determines that the vector between the airplane location at the two times is $r=-50\hat{X}+20\hat{Y}$ for a magnitude of $r=53.85$ m (i.e., $r=\sqrt{(50)^2+(20)^2}=53.85$). Further, assume from imagery taken by imaging sensor 14, and the analysis thereof by DSP 16 using known techniques as demonstrated in FIGS. 6 and 7, that the pixel location of feature SF from FIG. 5 is as represented by crosshair CRH at time $t_1$ in image $IMG_1$ of FIG. 6 is (386, 249), and assume similarly that the pixel location of feature SF from FIG. 5 is as represented by crosshair CRH at time $t_2$ in image $IMG_2$ of FIG. 7 is (423, 242). In response, system 10 may compute the line-of-sight ("LOS") unit vector, $\hat{R}_1$ from system 10 to feature SF at time $t_1$ by converting the pixel location to angles relative to the gimbal, creating a unit vector from the two angles, and then transforming this vector from the gimbal to the body then to the inertial frame. The angle $\theta_1$ between the LOS unit vector at $t_1$ (from system 10 to feature SF) and r is found using the following Equation 10:

$$\theta_1 = \text{acos}\left(\frac{r \cdot \hat{R}_1}{r}\right) \qquad \text{Equation 10}$$

For this example, $\theta=13.33°$. Similarly, at time $t_2$ the angle $\theta_2$ between the LOS unit vector at $t_2$ and r is found using the following Equation 11:

$$\theta_2 = \text{acos}\left(\frac{r \cdot \hat{R}_2}{r}\right) \qquad \text{Equation 11}$$

Equation 11, when solved, yields in the present example $\theta_2=17.04°$. Given the LOS unit vectors at times $t_1$ and $t_2$ to scene feature SF, then with the image data taken at those times the preferred embodiments determine the (x, y, z) coordinates of that feature SF in the plane of image data. At this point, therefore, Equations 3 through 6 are readily solved by the preferred embodiment to determine the distance $R_1$ or $R_2$ from feature SF to system 10 at either time $t_1$ or $t_2$. Note also that with distances $R_1$ and $R_2$, system 10 also may estimate at the second time $t_2$ a coordinate position of the vehicle containing the system at (200.48 meters, 150.74 meters, 44.83 meters), as compared, for the sake of this example, to its location assumed in the example of (200.38 meters, 150.50 meters, 45.04 meters). Thus, VGS 12 may update its estimation of position (i.e., coordinate position in the present example) based on the determined values of $R_1$ and $R_2$.

The preferred embodiments may be analyzed, and also may be further modified, in view of an error sensitivity analysis of various aspects presented above. Recall in the preferred embodiments that preferably the basic measurement of imaging sensor 14 is made in pixels in the image itself. This pixel measurement is then converted to an angle by taking into account the gimbal angles and the vehicle's flight path vector. Angles $\theta_1$ and $\theta_2$ are affected by many different sources or factors: the Euler angles of the INS system, the gimbal angles, the gimbal to body misalignment, and errors in the location of the feature within the image, due, for example, to blurring or smearing. The combined effect of all these sources affects the measurement accuracy. Therefore, a sensitivity analysis demonstrates the effects of these errors on the range estimates provided by the preferred embodiment, and it also provides for further modification of the preferred methodology, as detailed below.

Recall that Equations 6 through 9 demonstrate the relationships between R, D, $R_1$ and $R_2$. The partial derivatives of each range estimate $R_1$ or $R_2$, with respect to each potential error source, provides a first-order analysis of the sensitivity of the range estimates with respect to errors in r, $\theta_1$, and $\theta_2$. Notice, however, that by substituting the definitions of R and D into the range equations, complexities are increased. Further, such definitions become even more cumbersome when the partial derivatives thereof are computed. Since we expect the angles to typically be relatively small, one skilled in the art may simplify the analysis using small angle approximations. This returns the following approximations to Equations 6 through 9 above, with the respective estimations shown as Equations 6a through 9a, below:

$$R \approx \frac{r\theta_1}{(\theta_2 - \theta_1)} \qquad \text{Equation 6a}$$

$$D \approx R\theta_2 \qquad \text{Equation 7a}$$

$$R_1 \approx \frac{r\theta_2}{(\theta_2 - \theta_1)} \qquad \text{Equation 8a}$$

$$R_2 \approx \frac{r\theta_1}{(\theta_2 - \theta_1)} \qquad \text{Equation 9a}$$

Next, the partial derivatives may be ascertained with respect to Equations 8a and 9a to demonstrate the sensitivity of each range determination vis-à-vis a change in one of the variables upon which it is determined. Thus, the partial derivatives with respect to Equation 8a are shown in the following Equations 12 through 14, and the partial derivatives with respect to Equation 9a are shown in the following Equations 15 through 17:

$$\frac{\partial R_1}{\partial r} \approx \frac{\theta_2}{(\theta_2 - \theta_1)} \qquad \text{Equation 12}$$

$$\frac{\partial R_1}{\partial \theta_1} \approx \frac{r\theta_2}{(\theta_2 - \theta_1)^2} \qquad \text{Equation 13}$$

$$\frac{\partial R_1}{\partial \theta_2} \approx \frac{-r\theta_1}{(\theta_2 - \theta_1)^2} \qquad \text{Equation 14}$$

$$\frac{\partial R_2}{\partial r} \approx \frac{\theta_1}{(\theta_2 - \theta_1)} \qquad \text{Equation 15}$$

$$\frac{\partial R_2}{\partial \theta_1} \approx \frac{r\theta_2}{(\theta_2 - \theta_1)^2} \qquad \text{Equation 16}$$

$$\frac{\partial R_2}{\partial \theta_2} \approx \frac{-r\theta_1}{(\theta_2 - \theta_1)^2} \qquad \text{Equation 17}$$

To demonstrate these findings, then with respect to the range $R_1$, and using the values from the above example above, yields the following:

$$\frac{\partial R_1}{\partial r} \approx 4.6 \text{ meters/meter,}$$

-continued $$\frac{\partial R_1}{\partial \theta_1} \approx 1.9 \text{ meters/pixel}, \quad \frac{\partial R_1}{\partial \theta_2} \approx -1.5 \text{ meters/pixel}$$

If the angles are perceived as larger than what might be comfortably accepted as "relatively small," then the analysis also may be performed without using the small angle approximations. In this case, the resultant equations may be derived and might be perceived as cumbersome, yet the result even with those equations is that the sensitivity estimates above vary only by 1 to 2% for this example case.

Equations 12 through 17 also demonstrate that in the preferred embodiment methodology, the error sensitivity approximations each have the difference of the two angles $\theta_1$ and $\theta_2$ in their denominators. It is therefore observed in connection with the preferred embodiments that the error will be lower if this difference between $\theta_1$ and $\theta_2$ is larger and, indeed, in the cases of the error with respect to $\theta_1$ and $\theta_2$, the denominator is a squared term meaning the sensitivity is driven lower rapidly as the difference increases. By way of example, consider the case where the angle separation is doubled by changing the value of $\theta_2$ to 20.75°:

$$\frac{\theta_2}{20.75°}: \quad \frac{\partial R_1}{\partial r} \approx 2.8 \text{ meters/meter},$$

$$\frac{\partial R_1}{\partial \theta_1} \approx 0.6 \text{ meters/pixel}, \quad \frac{\partial R_1}{\partial \theta_2} \approx -0.4 \text{ meters/pixel}$$

The preceding analysis indicates the accuracy of the estimation of these range values and thus the position vectors. In addition, however, from these indications the preferred embodiments permit further modification in that certain measurements may be avoided if the error is larger than a desirable threshold or alternatively those measures may be weighted to have a lesser impact in the preferred embodiment computations. In other words, under such a modification the preferred embodiments select which features in the image data provided by imaging sensor 14 are used in determining the range estimates $R_1$ and $R_2$, thereby controlling the overall estimation accuracy. Thus, to minimize variations in the range estimates, the preferred embodiment may choose a given feature with a field of view that provides a difference between $\theta_1$ and $\theta_2$ that is greater than a threshold or greater as compared to other features within that same field of view, thereby reducing the amount of error in the determination of ranges $R_1$ and $R_2$. Alternatively, the preferred embodiments may apply a weight in the selection of a feature or the determination of ranges $R_1$ and $R_2$ if the difference between $\theta_1$ and $\theta_2$ is perceived as relatively or unacceptably small.

From the preceding, it may be appreciated that the preferred embodiments provide apparatus and methodology for determining a range between a system and an object or point away from the system in response to image data. In the preferred embodiment, the image data provided is captured with a passive device, thereby avoiding the use of active sensors as is implemented in the prior art. Note that a passive sensor of the type described herein may already be included in various systems aboard a vehicle and as a result the preferred embodiment may be incorporated without the need for an additional sensor and without the need of an active sensor. Thus, there is potential reduction in cost, size, weight and complexity, and as a result certain disadvantages of the prior art are successfully overcome. Moreover, the preferred embodiment has been demonstrated to include additional aspects beyond ranging, including collision avoidance, navigation, automatic landing, three-dimensional imaging and similar applications. In all events therefore, various alternatives have been provided according to preferred embodiments, and still others may be ascertained by one skilled in the art. Given the preceding, therefore, one skilled in the art should further appreciate that while the present embodiments have been described in detail, various substitutions, modifications or alterations could be made to the descriptions set forth above without departing from the inventive scope, as is defined by the following claims.

The invention claimed is:

1. A distance determining system for use in a movable device, comprising:
    circuitry located at a single location relative to the movable device and for capturing at a time a single image, comprising a plurality of pixels in a field of view relative to a bore site, of an object external from the movable device and wherein the object is located in the field of view and off the bore site;
    circuitry, responsive to pixel location of image data in the single image and that represents the object image, for determining an angle between a direction of movement of the movable device and the object; and
    circuitry for determining a distance to the object in response to angular information determined in response to image data captured solely from the single location, the angular information comprising at least the angle.

2. The system of claim 1 wherein the circuitry for capturing an image comprises a passive image sensor.

3. The system of claim 1:
    wherein the image comprises a first image;
    wherein the circuitry for capturing is further for capturing the first image at a first time and for capturing a second image of the object at a second time; and
    wherein the circuitry for determining the distance to the object determines the distance to the object also in response to the second image.

4. The system of claim 3:
    wherein the angle comprises a first angle;
    wherein the circuitry for determining an angle is further responsive to the second image and is for determining a second angle between a direction of movement of the movable device and the object; and
    wherein the circuitry for determining the distance to the object determines the distance to the object also in response to the second angle.

5. The system of claim 4:
    and further comprising circuitry for determining a distance traveled by the movable device between the first time and the second time; and
    wherein the circuitry for determining the distance to the object determines the distance to the object also in response to the distance traveled by the movable device between the first time and the second time.

6. The system of claim 5 wherein the circuitry for capturing an image comprises a passive image sensor.

7. The system of claim 5 wherein the circuitry for capturing an image comprises is selected from a set consisting of an infrared sensor, a passive infrared sensor, a forward looking infrared sensor, and a visible spectrum camera.

8. The system of claim 5 and further comprising circuitry for selecting the object in response to a difference between the first angle and the second angle.

9. The system of claim 1 wherein the circuitry for determining a distance to the object in response to at least the angle defines, in response to two different measurement times, two respective right triangles between the circuitry for capturing an image and the object and determines the distance in response to the two respective right triangles.

10. The system of claim 9 wherein one right triangle of the two respective right triangles comprises:
    a first vertex at a position of the movable object at a first of the two different measurement times;
    a second vertex at a position representing a co-linear extension added to a position vector extending between the first vertex and a position of the movable object at a second of the two different measurement times;
    a third vertex located at the object; and
    a first side extending from the first vertex to the second vertex; and
    a second side extending from the second vertex to the third vertex and perpendicular to the first side.

11. The system of claim 9 wherein one right triangle of the two respective right triangles comprises:
    a first vertex at a position of the movable object at a second of the two different measurement times;
    a second vertex at a position representing a co-linear extension added to a position vector extending between the second vertex and a position of the movable object at the first of the two different measurement times;
    a third vertex located at the object; and
    a first side extending from the first vertex to the second vertex; and
    a second side extending from the second vertex to the third vertex and perpendicular to the first side.

12. The system of claim 9:
    wherein a first right triangle of the two respective right triangles comprises:
        a first vertex at a position of the movable object at a first of the two different measurement times;
        a second vertex at a position representing a co-linear extension added to a position vector extending between the first vertex and a position of the movable object at a second of the two different measurement times;
        a third vertex located at the object; and
        a first side extending from the first vertex to the second vertex; and
        a second side extending from the second vertex to the third vertex and perpendicular to the first side; and
    wherein a second right triangle of the two respective right triangles comprises:
        a first vertex at a position of the movable object at the second of the two different measurement times;
        the second vertex of the first right triangle; and
        the third vertex of the first right triangle.

13. The system of claim 1 wherein the movable device comprises a device capable of flight, and further comprising circuitry for deriving the altitude of the device in response to the determined distance to the object.

14. The system of claim 1 wherein the movable device comprises a device capable of flight, and further comprising circuitry for changing a path of direction of the device in response to the determined distance to the object.

15. The system of claim 1 wherein the movable device comprises a device capable of flight, and further comprising circuitry for estimating a position of device in response to the determined distance to the object.

16. The system of claim 1 further comprising circuitry for targeting the object in response to the determined distance to the object.

17. The system of claim 1 further comprising circuitry for projecting a three dimensional display of the object in response to the determined distance to the object.

18. The system of claim 1 wherein the circuitry for determining an angle and the circuitry for determining a distance to the object comprise circuitry that is part of a processor.

19. A method of determining a distance to a system relative to a movable device, comprising:
    capturing, at a single location relative to the movable device, a single image, comprising a plurality of pixels in a field of view relative to a bore site, of an object external from the movable device and wherein the object is located in the field of view and off the bore site;
    operating a processor to determine an angle between a direction of movement of the movable device and the object in response to pixel location of image data in the single image and that represents the object; and
    operating a processor to determine the distance to the object in response to angular information determined in response to image data captured solely from the single location, the angular information comprising at least the angle.

20. The method of claim 19:
    wherein the image comprises a first image;
    wherein the step of capturing is further for capturing the first image at a first time and for capturing a second image of the object at a second time; and
    wherein the step of operating a processor to determine the distance to the object determines the distance to the object also in response to the second image.

21. The method of claim 20:
    wherein the angle comprises a first angle;
    wherein the step of operating a processor to determine an angle is further responsive to the second image and is for determining a second angle between a direction of movement of the movable device and the object; and
    wherein the step of operating a processor to determine the distance to the object determines the distance to the object also in response to the second angle.

22. The method of claim 21:
    and further comprising determining a distance traveled by the movable device between the first time and the second time; and
    wherein the step of operating a processor to determine the distance to the object determines the distance to the object also in response to the distance traveled by the movable device between the first time and the second time.

23. A distance determining system for use in a movable device, comprising:
    circuitry for capturing an image, comprising a plurality of pixels in a field of view relative to a bore site, of an object external from the movable device;
    circuitry, responsive to pixel location of image data in the image and that represents the object, for determining an angle between a direction of movement of the movable device and the object; and
    circuitry for determining a distance to the object in response to at least the angle;
    wherein the image comprises a first image;
    wherein the circuitry for capturing is further for capturing the first image at a first time and for capturing a second image of the object at a second time; and wherein the circuitry for determining the distance to the object determines the distance to the object also in response to the second image;
wherein the angle comprises a first angle;
wherein the circuitry for determining an angle is further responsive to the second image and is for determining a second angle between a direction of movement of the movable device and the object; and
wherein the circuitry for determining the distance to the object determines the distance to the object also in response to the second angle;
and further comprising circuitry for determining a distance traveled by the movable device between the first time and the second time; and
wherein the circuitry for determining the distance to the object determines the distance to the object also in response to the distance traveled by the movable device between the first time and the second time;
and further comprising circuitry for selecting the object in response to a difference between the first angle and the second angle.

24. A distance determining system for use in a movable device, comprising:
circuitry for capturing an image, comprising a plurality of pixels in a field of view relative to a bore site, of an object external from the movable device;
circuitry, responsive to pixel location of image data in the image and that represents the object, for determining an angle between a direction of movement of the movable device and the object; and
circuitry for determining a distance to the object in response to at least the angle;
wherein the circuitry for determining a distance to the object in response to at least the angle defines, in response to two different measurement times, two respective right triangles between the circuitry for capturing an image and the object and determines the distance in response to the two respective right triangles;
wherein one right triangle of the two respective right triangles comprises:
a first vertex at a position of the movable object at a first of the two different measurement times;
a second vertex at a position representing a co-linear extension added to a position vector extending between the first vertex and a position of the movable object at a second of the two different measurement times;
a third vertex located at the object; and
a first side extending from the first vertex to the second vertex; and
a second side extending from the second vertex to the third vertex and perpendicular to the first side.

25. A distance determining system for use in a movable device, comprising:
circuitry for capturing an image, comprising a plurality of pixels in a field of view relative to a bore site, of an object external from the movable device;
circuitry, responsive to pixel location of image data in the image and that represents the object, for determining an angle between a direction of movement of the movable device and the object; and
circuitry for determining a distance to the object in response to at least the angle;
wherein the circuitry for determining a distance to the object in response to at least the angle defines, in response to two different measurement times, two respective right triangles between the circuitry for capturing an image and the object and determines the distance in response to the two respective right triangles;
wherein one right triangle of the two respective right triangles comprises:
a first vertex at a position of the movable object at a second of the two different measurement times;
a second vertex at a position representing a co-linear extension added to a position vector extending between the second vertex and a position of the movable object at the first of the two different measurement times;
a third vertex located at the object; and
a first side extending from the first vertex to the second vertex; and
a second side extending from the second vertex to the third vertex and perpendicular to the first side.

26. A distance determining system for use in a movable device, comprising:
circuitry for capturing an image of an object external from the movable device;
circuitry, responsive to the image, for determining an angle between a direction of movement of the movable device and the object; and
circuitry for determining a distance to the object in response to at least the angle;
wherein the circuitry for determining a distance to the object in response to at least the angle defines, in response to two different measurement times, two respective right triangles between the circuitry for capturing an image and the object and determines the distance in response to the two respective right triangles;
wherein a first right triangle of the two respective right triangles comprises:
a first vertex at a position of the movable object at a first of the two different measurement times;
a second vertex at a position representing a co-linear extension added to a position vector extending between the first vertex and a position of the movable object at a second of the two different measurement times;
a third vertex located at the object; and
a first side extending from the first vertex to the second vertex; and
a second side extending from the second vertex to the third vertex and perpendicular to the first side; and
wherein a second right triangle of the two respective right triangles comprises:
a first vertex at a position of the movable object at the second of the two different measurement times;
the second vertex of the first right triangle; and
the third vertex of the first right triangle.

* * * * *